May 21, 1935.   I. H. WITT   2,002,383
METHOD OF STOPPING GAS FLOW THROUGH PIPES
Filed Oct. 5, 1931   2 Sheets-Sheet 1
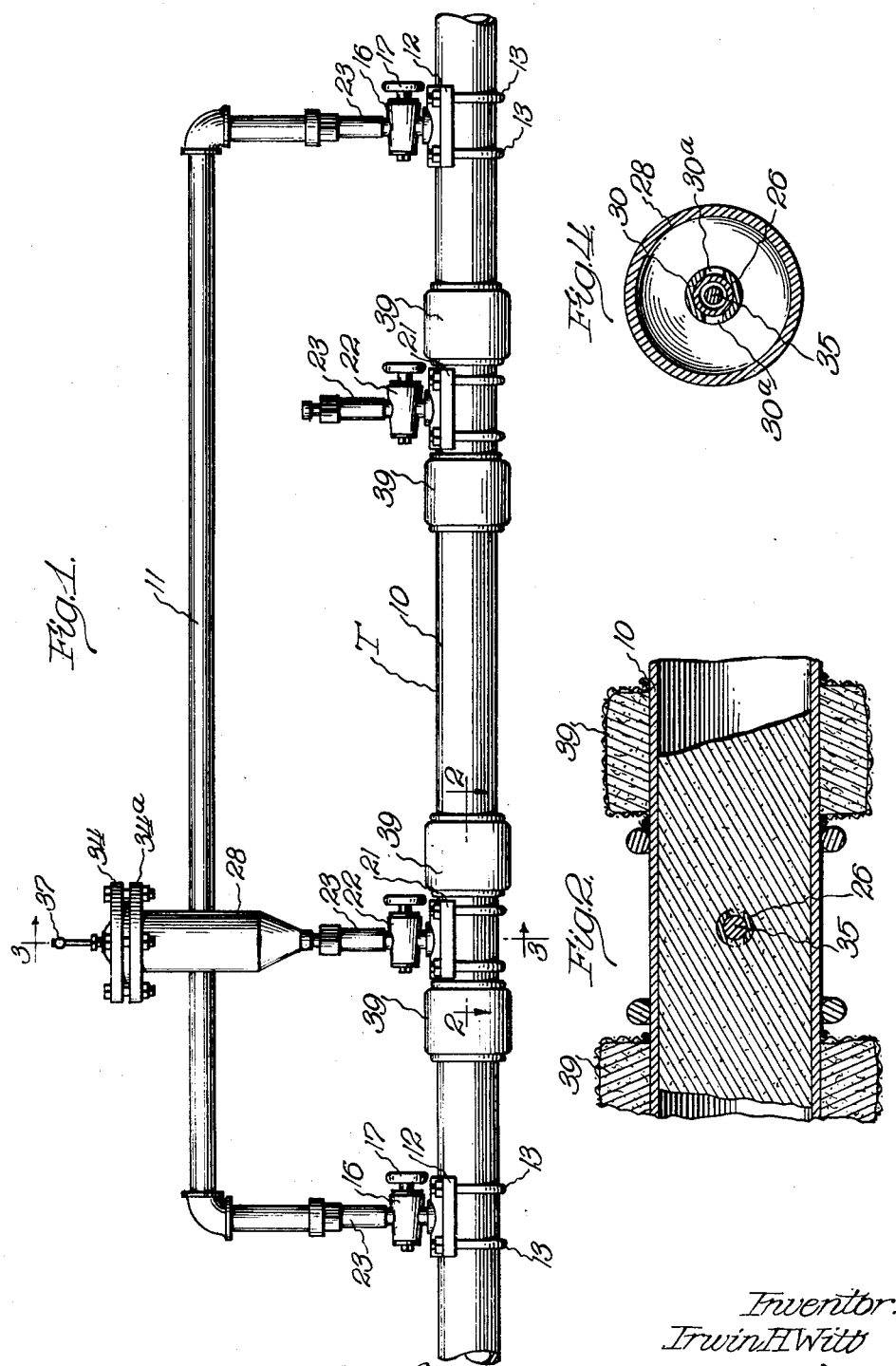
Inventor:
Irwin H Witt
By [signature]
Attys.

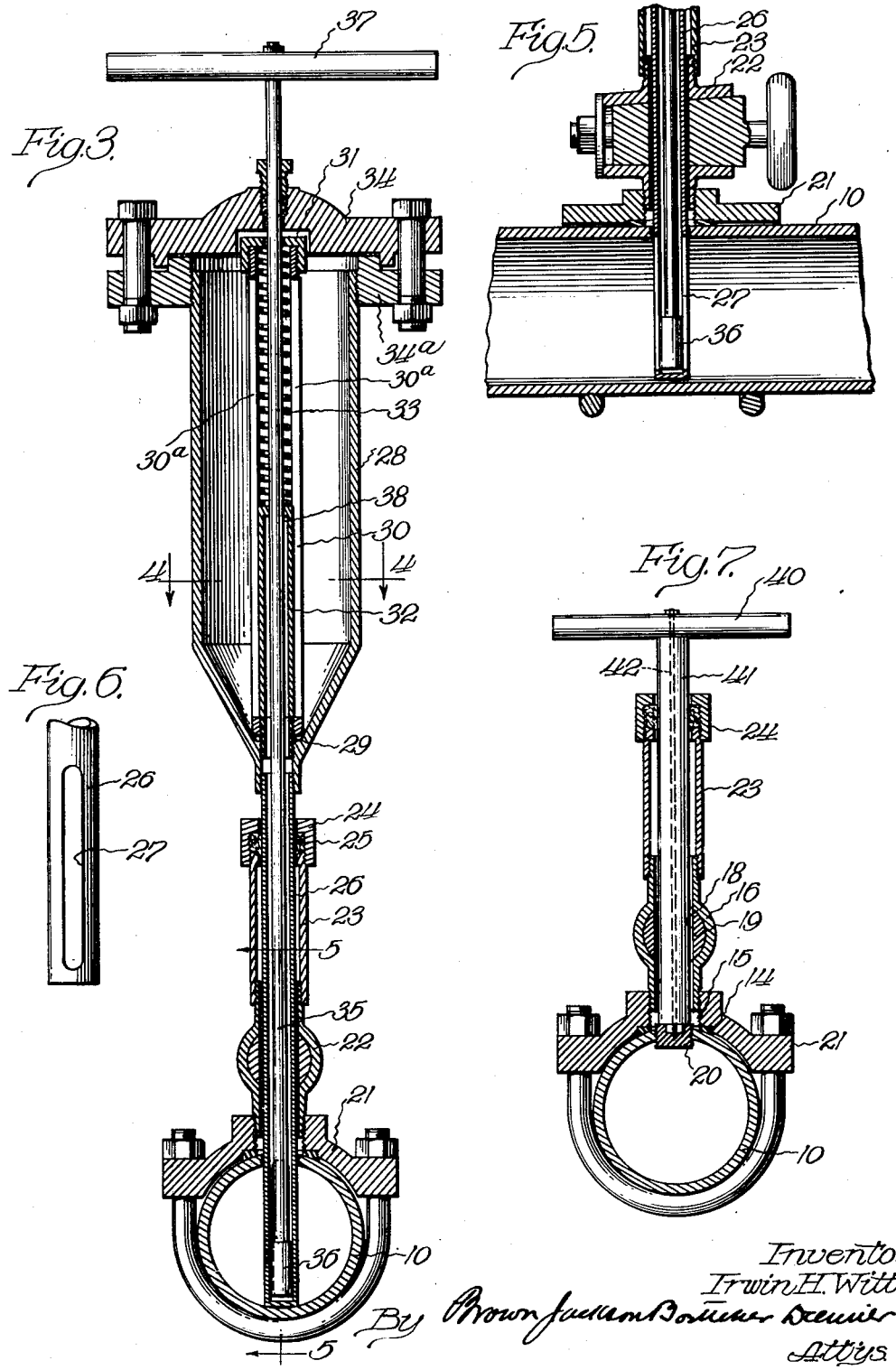

Patented May 21, 1935

2,002,383

UNITED STATES PATENT OFFICE 2,002,383

METHOD OF STOPPING GAS FLOW THROUGH PIPES

Irwin H. Witt, Evanston, Ill.

Application October 5, 1931, Serial No. 566,881

8 Claims. (Cl. 137—73)

This invention relates to a method of and apparatus for stopping gas flow through pipes.

Insofar as I am aware no method has been devised, prior to the present invention, whereby a gas conduit can be severed for the purpose of connecting a branch pipe thereto, without interrupting the service to customers beyond the point where the connection is to be made, where said conduit was not provided originally with suitable shut-off valves and couplings in contemplation of the installation of such branch.

The chief object of the invention is to provide a method of stopping the flow of gas through pipes to permit without special prearrangement the insertion of T's or other couplings anywhere in the pipes without interrupting the service at points beyond the point at which the flow is stopped.

Thus in connecting branch lines to gas mains at the present time it is necessary generally to interrupt the service to consumers located beyond the place at which the connection of the new branch to the main is to be made, unless suitable valves and couplings for by-passes have been provided in the main in anticipation of the installation of such additional branches.

With the present improvements the necessary by-pass can be installed to avoid interruption of the service to customers and a branch line connected to the main in the by-passed section thereof without appreciable loss of gas and without otherwise interfering with its flow to the consumers along the main.

Another object of the invention is to provide apparatus for making by-pass connections to gas pipes and for stopping the flow of gas through the by-passed section of the main line preparatory to connecting the branch to the main without the interruption of service along the line.

In carrying out the present invention a by-pass is provided around the point at which the branch line is to be connected and within the by-passed section of the main, the latter is sealed by means of ice which is formed in the mains, generally at two points, to prevent gas leakage from the main when the latter is severed preparatory to the installation of a T or other connection for the branch.

The invention is not to be limited to the insertion of a valve, T, or the like but comprehends in its broader aspects the stoppage of flow in a gas main or the like.

The accompanying drawings illustrate apparatus embodying the present invention, and by the use of which the improved method can be carried out In the drawings:

Figure 1 is a view showing a gas main and apparatus in position preparatory to connecting a branch line to the main.

Figure 2 is a sectional view taken on line 2—2 of Figure 1.

Figure 3 is a longitudinal section taken on line 3—3 of Figure 1.

Figure 4 is a transverse section taken on line 4—4 of Figure 3, illustrating apparatus for injecting slush ice or the like into the main to be frozen therein.

Figure 5 is a sectional view taken on line 5—5 of Figure 3.

Figure 6 is an enlarged detail view of the lower end of the injecting device.

Figure 7 is a longitudinal sectional view of apparatus for plugging the openings in the main after the installation of the branch has been effected.

In the drawings, 10 indicates a gas main to which, as at approximately point T, it is desired to connect a branch pipe without interrupting service to consumers along the line. Prior to making the installation of the branch in accordance with the present invention, a by-pass 11 is first provided around the point at which the branch connection is to be made. In installing the by-pass, saddles 12 are clamped to the main, one on each side of the point T. The saddles 12 may be held in position by U-bolts 13 and by means of which the saddles can be forced into gas tight contact with the main 10. In Figures 3 and 7 such saddles are shown having gaskets 14 interposed between the same and the pipe 10 to insure gas tight joints.

Each saddle 12 has an interiorly threaded passage 15 into which is screwed a valve or pet cock 16 having an operating handle 17. The pet cock is so constructed that a bit can be inserted in the cock, and passed through the valve opening 18 in the stem 19 into contact with the pipe 10. The drill employed preferably is provided with a tap which threads the opening cut in the pipe by the drill for receiving a plug 20 which is not inserted, however, until the branch pipe has been connected, as described hereinafter. When the drill and taps have been withdrawn, the cock 16 is closed. Pipes constituting the by-pass 11 are connected to the threaded outer ends of the cocks 16 and the valves thereof turned to open position to permit the gas to by-pass the point T at which the branch is to be connected. This tends also to equalize the gas pressure at the opposite sides of the plug which is to be formed.

To stop the flow of gas through the by-passed section of the main 10, the latter is plugged by freezing water, or preferably slush ice within the pipe. Two such ice plugs or pairs of plugs will be formed ordinarily but where the branch is to be near the end of a line, one plug will be sufficient.

To form the ice plugs for preventing gas flow in the by-passed section of the main 10, intermediate saddles 21 are secured to the main, one on each side of the point T. The saddles 21 and their clamps are similar to those above described. Each saddle 21 likewise is provided with a pet cock 22 similar to cocks 16. As shown in Fig. 3, a short pipe 23 is secured to the outer end of the cock 22, and is provided with a packing gland 24 for compressing packing 25 against the tube 26 to prevent the escape of gas around the exterior of the tube. The lower end of the tube 26 is closed, and adjacent the end, discharge openings or slots 27 are provided. These openings have a length which is substantially equal to or in excess of the diameter of the pipe 10. It is desirable that the top of the slot 27 be at or above the top wall of the pipe 10 so that the complete cross section of pipe 10 will be filled with ice and sealed off.

Secured to the upper end of the tube 26 is a receptacle 28, the lower end of which is conical or otherwise suitably shaped to direct slush ice or the like contained in the receptacle into the tube 26 as described later. One advantage of using slush ice or a mixture of snow and water is that such material has a relatively high angle of repose and does not readily flow away from the point of injection, as illustrated in Figure 2. This materially assists in the formation of a definite localized plug. A short threaded coupling 29 is positioned near the lower end of the receptacle 28, as shown in Fig. 3, and to the exteriorly threaded upper end of the coupling is secured a tube 30 which is slotted as at 30a preferably throughout its length except at the lower end where it is threaded to the coupling 29 and at its upper end where it is threaded to the cap 31. The slotted tube 30 constitutes a guide for the sliding tube 32, the lower open end of which, as shown in Figure 3, rests on the upper end of the coupling 29 when the tube 32 is in lower position. A spring 33, confined between the upper end of the tube 32 and the cap 31 tends to hold tube 32 in lower position. Passing through the cover plate 34 of the receptacle 28 and through the passage defined by the aligned tubes 32, 29 and 26, is a rod 35 having a head or plunger 36 at its lower end and a handle 37 at its upper end.

The receptacle 28 is designed for holding slush ice or snow which can be inserted therein when the cover 34 is removed. The cover, when bolted to the seat 34a, prevents the escape of gas from the receptacle 28. Upon raising the rod 35, the head 36 will engage the shoulder 38 at the upper end of the tube 32 and thus elevate the latter from seating position on the coupling 29. A quantity of the slush ice or snow of the container 28 will pass through the slots of the tube 30 and will pass or will be forced through the passage of tube 26 and out through the slots 27 upon the downward stroke of the plunger 36. The slots 27 open longitudinally of the pipe so that a block or plug of ice will be formed across the cross sectional area of the pipe preferably at each side of pipe 26, thus providing a double seal. Upon the downward stroke of the plunger 26, the spring 33 presses the tube 32 into seating position on the member 29, thus preventing the entrance of ice or snow into the discharge passage behind the plunger 36 and interfering with the proper operation of the pumping mechanism.

To freeze the slush ice or snow within the main 10 as fast as it is discharged thereinto, a suitable quantity of dry ice (frozen $CO_2$) is packed around the main and held in position by any suitable means, as by canvas containers indicated as 39 in Figure 1. The low temperature of the dry ice quickly freezes each successive discharge of the slush ice and as successive quantities are frozen, complete plugs of ice will be built up within the main 10 and completely close the same against the flow of gas to the point T. The pumping of the slush into the main insures that a complete plug will be formed and be so tight that no further slush ice can be injected.

When the main has been plugged at each side of the point T where the branch is to be connected, the main can be severed and a T-union or other coupling inserted and the branch pipe connected thereto. The container 39 may then be removed, and the ice plugs permitted to melt after which flow of fluid through the main is re-established.

Prior to removing the apparatus entirely from the main 10, the openings formed in the main will preferably have inserted therein brass plugs 20 above referred to. In removing the by-pass, the cocks 16 will be closed and the pipes disconnected from the tubes 23. A tool, such as is shown in Fig. 7, may be employed for inserting the plugs 20. The tool comprises, in the form shown, a handle 40 to which is secured a tube 41 and extending through the tube is a rod 42 threaded at its lower end for engagement with a threaded recess formed in the upper socketed end of the plug 20. The threads of the recess are opposite in direction to the threads of the plug. The tube 41 and the attached plug 20 are inserted through the tube 23 and the cap gland 24 may be tightened. The cock 16 is then turned to open position, and the tube 41 and plug 20 passed through the same and rotated to screw the plug into the opening in the main. The handle 40 may then be rotated in the opposite direction to release the rod 42 from the plug and the cock 16 and the parts carried thereby, and also the saddle 21 removed from the main 10. A socket wrench may then be used for tightening the plug in the pipe.

The plugging of the other openings in the pipe through which the slush ice is inserted is accomplished in similar manner, and need not be further described.

While the use of dry ice as described above is preferred, a mixture of water ice and salt may be used if desired, although the time required for forming the ice plug within the pipe will of course be considerably increased by the use of the same. Slush ice or finely cracked ice and water freezes more readily than water alone, and is therefore preferred, although the latter may be employed. The use of other substances in fluid or mobile form capable of congealing at the temperature prevailing in the conduit into which they are inserted is considered to be within the scope of my invention.

It will be observed that the by-pass 11 substantially equalizes the pressure on the opposite sides of the ice plugs. I do not wish to be limited to ice plugs, as any suitable medium which may be changed by heat transfer through the walls of the main or pipe 10 comes within the scope of my invention.

Although I have shown and described an embodiment of my invention for the purpose of illustration, I do not wish to be restricted thereto except as limited by the appended claims.

I claim:—

1. The method of stopping the flow of fluid in a main preparatory to connecting a branch pipe thereto which comprises inserting a substance, which is fluid at the normal temperature of said main but which is more readily freezable than said fluid, through the walls of the main at each side of the place where the connection is to be made, congealing said substance within the main across the cross sectional area thereof prior to connecting said branch to the main by subjecting the latter to a temperature change different from the normal temperature of said main, and maintaining said temperature difference so long as it is desired that no fluid shall flow through the main.

2. The method of connecting a branch pipe to a gas main at a given point which comprises by-passing the gas around said point of the main, forcibly inserting a slow-flowing substance which is more readily freezable than said gas through the walls of the main at each side of said point, freezing said inserted substance within the main to provide plugs across cross sectional areas thereof, thereafter connecting said branch pipe to said main at said point, and restoring normal temperature conditions to the main to provide for the resumption of gas flow therethrough.

3. The method of stopping the flow of fluid through a particular section of a pipe, which method comprises establishing a by-pass to conduct fluid around said section to reduce the flow through the section, inserting a congealable substance into said section, and congealing the substance until substantially all flow through the section is stopped.

4. The method of controlling the flow of gas in a conduit which consists in temporarily stopping the flow of gas by inserting through the walls of said conduit material separate from said gas and capable of congealing therein, congealing said material to build up a mass substantially filling that portion of the conduit, and then freeing said material by supplying heat thereto to reestablish flow through said conduit.

5. The method of stopping the flow through a main having an unobstructed interior, which method comprises reducing the temperature of the main where the flow is to be stopped to a point appreciably below the freezing point of the material to be inserted, and then inserting successive quantities of said material through the walls of said main so that each quantity solidifies as it reaches the zone of low temperature, whereby a plug is built up in the main completely filling the interior of a section thereof.

6. The method of stopping the flow through a pipe which comprises inserting through the walls of the pipe a substance which expands upon solidifying and which is more readily freezable than the fluid flowing through said pipe, and freezing said material to cause the same to expand and form a tight plug entirely filling the interior of a section of the pipe.

7. The method of temporarily stopping the flow of fluid in a main which comprises inserting through the walls of the main a material having a high angle of repose, so that the material will not readily flow away from the point of injection, congealing said material by the application of a temperature change to the portion of the main adjacent the point of injection, and then removing the application of said temperature change to restore the normal fluid flow through said main.

8. The method of temporarily stopping the flow of fluid in a conduit which comprises chilling a portion of the conduit, gradually injecting through the walls of said portion a material having a high angle of repose in the condition inserted and which will solidify in the conduit thereby building up a plug filling the interior of the conduit to stop said fluid flow, and then restoring the normal fluid flow through said conduit by removing the application of said temperature change and permitting said material to flow away from the point of injection.

IRWIN H. WITT.